United States Patent
Mehrabi et al.

(10) Patent No.: US 12,113,373 B2
(45) Date of Patent: Oct. 8, 2024

(54) WIRELESS POWER SYSTEM WITH CHARGING ALERTS

(71) Applicant: Apple Inc., Cupertino, CA (US)

(72) Inventors: Arash Mehrabi, Menlo Park, CA (US); Dmitry Berdnikov, San Jose, CA (US)

(73) Assignee: Apple Inc., Cupertino, CA (US)

( * ) Notice: Subject to any disclaimer, the term of this patent is extended or adjusted under 35 U.S.C. 154(b) by 575 days.

(21) Appl. No.: 17/506,285

(22) Filed: Oct. 20, 2021

(65) Prior Publication Data

US 2022/0200362 A1    Jun. 23, 2022

Related U.S. Application Data

(60) Provisional application No. 63/127,022, filed on Dec. 17, 2020.

(51) Int. Cl.
| | |
|---|---|
| *H02J 7/00* | (2006.01) |
| *H02J 50/10* | (2016.01) |
| *H02J 50/40* | (2016.01) |
| *H02J 50/80* | (2016.01) |

(52) U.S. Cl.
CPC ............ *H02J 50/80* (2016.02); *H02J 50/10* (2016.02); *H02J 50/402* (2020.01); *H02J 2207/20* (2020.01)

(58) Field of Classification Search
USPC .......................................... 320/108
See application file for complete search history.

(56) References Cited

U.S. PATENT DOCUMENTS

| | | | |
|---|---|---|---|
| 9,899,883 B2 | 2/2018 | Liu | |
| 10,389,163 B2 | 8/2019 | Wong et al. | |
| 10,826,327 B2 | 11/2020 | Hoshino | |
| 10,879,742 B2 | 12/2020 | Okina | |
| 2005/0161079 A1* | 7/2005 | Gray | H04B 1/3883 136/251 |
| 2005/0189913 A1* | 9/2005 | Vitanov | H02J 7/0044 320/114 |
| 2008/0106232 A1* | 5/2008 | Idzik | H01M 10/441 320/103 |
| 2012/0091949 A1 | 4/2012 | Campanella et al. | |
| 2014/0195826 A1* | 7/2014 | Wojcik | H02J 7/342 713/300 |
| 2018/0309314 A1 | 10/2018 | White, II et al. | |

* cited by examiner

*Primary Examiner* — Samuel Berhanu
(74) *Attorney, Agent, or Firm* — Treyz Law Group, P.C.; G. Victor Treyz; Joseph F. Guihan

(57) ABSTRACT

A wireless power system has first and second electronic devices. The first electronic device may receive power from an alternating-current-to-direct-current power converter. A magnetic sensor and/or other sensing circuitry may detect when a second electronic device is attached to the first electronic device. In response to detecting device attachment and receipt of power from the power converter, the first electronic device sends test wireless power signals to the second electronic device. During reception of the test signals, the second electronic device adjusts a ballast load so that output current from a rectifier in the second electronic device flows through the ballast load. The output of the rectifier is measured and compared to a threshold voltage. If the rectifier output voltage exceeds the threshold, the first electronic device is directed to alert the user that wireless charging of the second electronic device is commencing.

21 Claims, 5 Drawing Sheets

WIRELESS POWER SYSTEM WITH CHARGING ALERTS

This application claims the benefit of provisional patent application No. 63/127,022, filed Dec. 17, 2020, which is hereby incorporated by reference herein in its entirety.

FIELD

This relates generally to power systems, and, more particularly, to wireless power systems for charging electronic devices.

BACKGROUND

Portable electronic devices such as cellular telephones have batteries. Removable battery cases are sometimes used to provide supplemental battery capacity to cellular telephones. By coupling a battery case to a cellular telephone or other portable electronic device, reserve battery power can be provided.

SUMMARY

A wireless power system has first and second electronic devices. The first electronic device may receive power from an alternating-current-to-direct-current power converter. When power is being received in this way, the first electronic device has an opportunity to wirelessly transmit power to the second electronic device to charge a battery in the second electronic device.

A magnetic sensor or other sensing circuitry may detect when the second electronic device is attached to the first electronic device. In response to detecting attachment of the second electronic device to the first electronic device and receipt of power from the power converter, the first electronic device sends test wireless power signals to the second electronic device. During reception of the test signals, the second electronic device adjusts a ballast load such as a ballast current source so that output current from a rectifier in the second electronic device flows through the ballast load. The output of the rectifier is measured while the rectifier output current is flowing through the ballast load. The measured rectifier output voltage is then compared to a threshold voltage.

If the rectifier output voltage exceeds the threshold, it can be concluded that wireless power coils in the first and second electronic devices are aligned with each other and that wireless power can be transferred from the first electronic device to the second electronic device with a satisfactory efficiency. Accordingly, the second electronic device wirelessly transmits information to the first electronic device that directs the first electronic device to alert the user that wireless charging of the second electronic device is commencing. Wireless power is transmitted from the first electronic device to the second electronic device to charge a battery in the second electronic device.

DETAILED DESCRIPTION

A wireless power system includes devices that are configured to transmit and/or receive wireless power. During wireless power transfer operations, a first device may transmit wireless power to a second device. The wireless power that is received by the second device may be used for charging a battery in the second device. In some scenarios, power may be provided to one device using a wired path and then transmitted wirelessly to another device. The system may include devices such as wrist watches, cellular telephones, tablet computers, laptop computers, removable battery cases, wireless charging pads and pucks, and/or other electronic equipment. Embodiments in which a first device such as a cellular telephone interacts with a second device such as a removable battery case for the cellular telephone may sometimes be described herein as an example. In general, the first and second devices may be any suitable electronic equipment.

Figure 1:
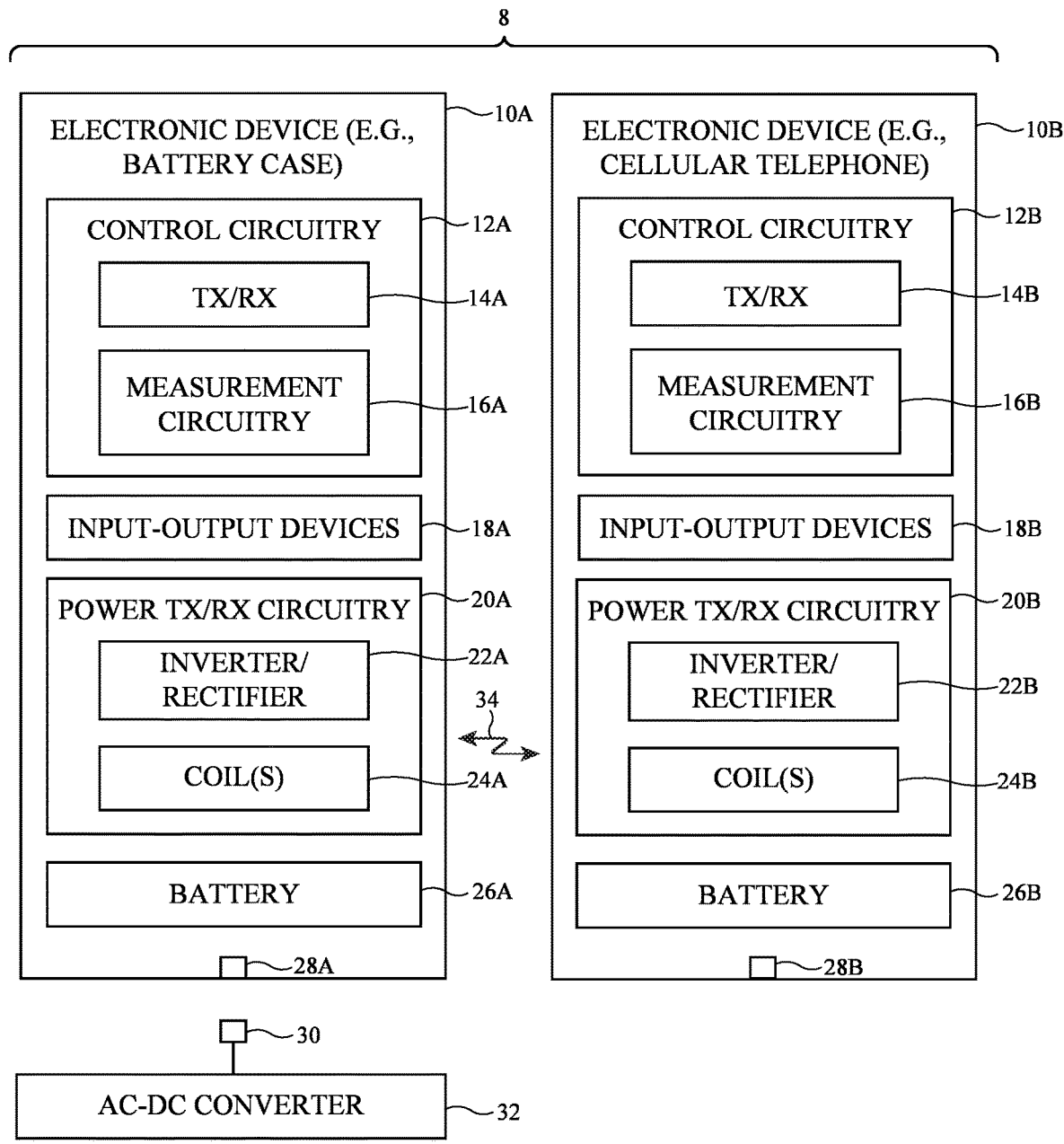
FIG. 1 is a schematic diagram of an illustrative wireless power system in accordance with an embodiment.

An illustrative wireless power system (wireless charging system) is shown in FIG. 1. As shown in FIG. 1, wireless power system 8 includes electronic device 10A and electronic device 10B. Device 10A may be, for example, a removable battery case. Device 10B may be a portable electronic device such as a cellular telephone (as an example). The housings of devices 10A and 10B may be configured to detachably mate with each other (e.g., so that a case may be attached to a cellular telephone when a user desires to add battery capacity to the cellular telephone and so that the case may be removed from the cellular telephone when it is desired to reduce size and weight. As indicated by wireless power signals 34, device 10A may transmit wireless power to device 10B and/or device 10B may transmit wireless power to device 10A. The transmitted power may be used, for example, to charge an internal battery in the device receiving the transmitted power.

Each device of system 8 may contain control circuitry (see, e.g., control circuitry 12A of device 10A and control circuitry 12B of device 10B). The control circuitry in system 8 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 10A and 10B. For example, the processing circuitry may be used in selecting coils for transmitting and/or receiving wireless power, for determining power transmission levels, for processing sensor data and other data to detect foreign objects, to detect electronic devices, and to perform other tasks, for processing user input, for handling negotiations between devices, for sending and receiving in-band and out-of-band data, for making measurements, for using in-band and/or out-of-band communications circuitry to transfer measurements, commands, alerts, and/or other information between devices, and for otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in the control circuitry. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of the control circuitry. The processing circuitry may include application-specific integrated circuits with processing circuitry, one or more microprocessors, a central processing unit (CPU) or other processing circuitry.

Devices 10A and 10B may have connectors such as connectors 28A and 28B that are configured to receive mating connector 30 at the end of a power cable associated with alternating-current-to-direct-current (AC-DC) power converter 32. Power converter 32 may be a stand-alone power adapter that has an alternating-current (AC) plug that plugs into a wall outlet or other source of AC power. When connector 30 is coupled to a device in system 8, converter 32 may be used to provide direct-current (DC) power. This DC power may be used to charge a battery (see, e.g., battery 26A in device 10A and battery 26B of device 10B). In some embodiments, device 10A and/or device 10B may include AC-DC power converter circuitry for receiving AC power from a cable coupled to a wall outlet or other AC power source and for converting this AC power into DC power to power the circuitry of device 10A and/or 10B. Arrangements in which converter 32 provides DC power to the devices of system 8 are sometimes described herein as an example.

DC power that is received by device 10A and/or device 10B is used to charge internal batteries and power internal device circuitry. In some configurations, power that is received from converter 32 may be relayed onward from one of the devices in system 8 to the other (e.g., to charge an internal battery in the other device). For example, if a user plugs connector 30 into connector 28A, device 10A can use the received power to charge battery 26A in device 10A. Device 10A can also transmit power wirelessly to device 10B, so that device 10B may charge its battery (battery 26B). Similarly, if a user plugs connector 30 into connector 28B, device 10B can charge battery 26B and/or can transmit power wirelessly to device 10A so that device 10A can charge battery 26A.

During wireless power transfer operations, the control circuitry of system 8 may use wireless power transmitting and/or receiving circuitry such as circuitry 20A and 20B to convey wireless power signals 34 between the devices of system 8.

When it is desired to transmit wireless power from circuitry 20A to circuitry 20B, switching circuitry such as an inverter in inverter/receiver circuitry 22A drives AC current signals through one or more wireless power transmitting coils such as wireless power transmitting coils 24A. These coil drive signals cause coil(s) 24A to transmit wireless power. As the AC currents pass through one or more coils 24A, alternating-current electromagnetic (e.g., magnetic) fields (wireless power signals 34) are produced that are received by one or more corresponding receiver coils such as coil(s) 24B in device 10B. When the alternating-current electromagnetic fields are received by coil(s) 24B, corresponding alternating-current currents are induced in coil(s) 24B. Rectifier circuitry such as rectifier circuitry in inverter/rectifier circuitry 22B, which contains rectifying components such as synchronous rectification metal-oxide-semiconductor transistors arranged in a bridge network, converts received AC signals (received alternating-current signals associated with electromagnetic signals 34) from one or more coils 24B into DC voltage signals for powering device 10B.

When it is desired to transmit wireless power from circuitry 20B to circuitry 20A, this process is reversed. Circuitry 22B uses switching circuitry such as an inverter to drive signals onto one or more of coils 24B to create wireless power signals 34 that are received by one or more coils 24A in device 10A and rectified by a rectifier in inverter/rectifier circuitry 22A.

If desired, circuitry 22A and/or circuitry 22B may contain only an inverter or only a rectifier. Configurations in which circuitry 22A and circuitry 22B have transistors or other switching circuits that can be configured to operate as either an inverter for transmitting power or a rectifier for receiving power are sometimes described herein as an example.

The DC voltage produced by the rectifier circuitry of devices 10A and 10B (sometimes referred to as rectifier output voltage Vrect) can be used in charging a battery and can be used in powering other components such as input-output devices (see, e.g., input-output devices 18A in device 10A and input-output devices 18B in device 10B). Input-output devices in the devices of system 8 may include input devices for gathering user input and/or making environmental measurements and may include output devices for providing a user with output. As an example, input-output devices 18A and/or 18B may include a display for creating visual output, a speaker for presenting output as audio signals, light-emitting diode status indicator lights and other light-emitting components for emitting light that provides a user with status information and/or other information, haptic devices for generating vibrations and other haptic output, and/or other output devices. The input-output devices may also include sensors for gathering input from a user and/or for making measurements of the surroundings of system 8. Illustrative sensors that may be included in input-output devices 18A and/or 18B include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar sensors which are sometimes referred to as light detection and ranging sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects (e.g., by emitting light and measuring reflected light), microphones for gathering voice commands and other audio input, distance sensors, sensors that are configured to gather information on motion, position, and/or orientation (e.g., accelerometers, gyroscopes, magnetic sensors such as compasses, and/or inertial measurement units that include all of these sensors or a subset of one or two of these sensors), sensors such as buttons that detect button press input, joysticks with sensors that detect joystick movement, keyboards, and/or other sensors. Device 10A may have one or more input-output devices such as these and/or device 10B may have one or more input-output devices such as these. If desired one or more of these input-output devices may be omitted from device 10A and/or 10B (e.g., to reduce device complexity).

Device 10A and/or device 10B may communicate wirelessly using in-band or out-of-band communications. Device 10A may have control circuitry that includes wireless transceiver circuitry 14A and/or device 10B may have control circuitry that includes wireless transceiver circuitry 14B. Circuitry 14A and/or 14B can be used to transmit out-of-band signals using an antenna (e.g., a Bluetooth® antenna, as an example). Correspondingly, circuitry 14B and/or circuitry 14A may use an antenna to receive the transmitted out-of-band signals. In-band transmissions between devices 10A and 10B may be performed using coils 24A and 24B to transmit and receive wireless communications signals (e.g., at frequencies below 1 MHz or other frequencies, as an example). Such in-band transmissions may take place during wireless power transfer operations with coils 24A and 24B. With one illustrative configuration, frequency-shift keying (FSK) and/or amplitude-shift keying (ASK) is used to convey in-band data between devices 10A and 10B. For example, a power transmitting device may use FSK communications during wireless power transmission and a power receiving device may use ASK communications during the wireless power transmission.

It is desirable for devices 10A and 10B to be able to communicate information such as received power, states of charge, and so forth, to control wireless power transfer. Such communication may include device identifiers and/or network identifiers that, for example, identify a battery case as such. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 12A may have measurement circuitry 16A and control circuitry 12B may have measurement circuitry 16B. The measurement circuitry may be used to detect foreign objects and/or electronic devices adjacent to a device housing. The housings of devices 10A and/or 10B may have polymer walls, walls of other dielectric, metal structures, fabric, and/or other housing wall structures that enclose coils and other device circuitry. If desired, the measurement circuitry can detect foreign objects such as coils, paper clips, and other metallic objects. In some embodiments, the measurement circuitry of a device can detect the presence of an adjacent electronic device (e.g., the measurement circuitry in one device can monitor the Q-factor and/or inductance of the coils of that device to detect the presence of another device, which can influence the Q-factor and/or coil inductance).

In an illustrative arrangement, the measurement circuitry of system 8 contains signal generator circuitry (e.g., oscillator circuitry for generating AC probe signals at one or more probe frequencies and/or a pulse generator that can create impulses so that impulse responses can be measured to gather inductance information from the frequency of ringing signals created in response to the impulses and to gather Q-factor information from the decay envelope of the ringing signals, etc.) and signal detection circuitry (e.g., filters, analog-to-digital converters, impulse response measurement circuits, etc.). In some configurations, Q-factor measurements, inductance measurement, and other measurements may be made on the coil(s) in system 8 before wireless power transmission operations have commenced, during wireless power transmission, during pauses between power transmission periods, and/or at other suitable times.

Measurement circuitry 16A and/or 16B may include current and voltage sensors and can be used to make real-time measurement of the currents and voltages of each device. For example, a voltage sensor in each device may be used in measuring the output voltage (Vrect) from the rectifier of each device and/or the inverter voltage of each device. Current sensors in each device may be used in measuring ballast load current, inverter current, rectifier current, etc.

During operation, measurement circuitry 16A and/or 16B may be used in making current and voltage measurements (e.g., inverter input current and input voltage, rectifier output current and output voltage, etc.), measurements of transmitted and received power for power transmission efficiency estimates, coil Q-factor measurements, coil inductance measurements, coupling coefficient measurements, and/or other measurements. Based on this information or other information, control circuitry in system 8 can characterize the operation of devices 10A and 10B. For example, measurement circuitry can measure one or more coils to determine the inductance(s) and Q-factor value(s) for the coil(s), can measure transferred power (e.g., by measuring the direct-current rectifier voltage and associated current in a power receiving device), and can make other measurements on operating parameters associated with wireless power circuitry and other components in devices 10A and 10B.

Before commencing wireless power transfer operations, devices 10A and 10B may negotiate and/or otherwise communicate with each other (e.g., using in-band communications). Prior to and/or during negotiations between devices 10A and 10B to set up normal power transmission (e.g., during initial wireless power transfer set-up operations before wireless power is ramped up to a level useful for battery charging), system 8 may perform a test power transfer measurement under known conditions. These measurements are sometimes referred to as a pre-transfer test, wireless power signal test, test wireless power transmissions, ballast load wireless power transfer test, etc.

As an example, the inverter in one device may briefly drive the coil of that device at its normal inverter voltage (e.g., 15 V) or at a slightly reduced inverter voltage (e.g., 13V). The use of a reduced inverter voltage may help prevent possible overvoltage situations at the wireless power receiver. While wirelessly transmitting these test signals, the other device in system 8 may measure voltage Vrect or measure power Prect at the output of the rectifier. Power may be routed to a ballast load (e.g., a ballast current source formed from one or more transistors) or other load in the receiving device while the receiving device (e.g., measurement circuitry of the control circuitry of the receiving device) measures Vrect. Testing may take any suitable amount of time (e.g., a period of time that is less than 100 ms, less than 50 ms, that is less than 20 ms, that is less than 10 ms, or that is less than 5 ms, as examples) to ensure that the amount of dissipated energy inside of the ballast load is limited. After testing is complete, the ballast load may be disconnected or ballast current may be decreased to a value associated with a smaller power dissipation.

The results of this initial wireless power test indicate whether devices 10A and 10B are coupled for satisfactory wireless power transfer. If the devices are misaligned, the electromagnetic coupling between the transmitting and receiving coils will not be satisfactory and the measured value of Vrect or Prect will be below a predetermined threshold voltage. If the devices are properly aligned, the electromagnetic coupling between the transmitting and receiving coils will be satisfactory, the predicted wireless power transfer efficiency when the wireless power transfer process is performed at normal power levels will be satisfactory, and the measured value of Vrect or Prect will be above the threshold voltage (or power threshold). Accordingly, the value of Vrect or Prect in this test can determine whether or not normal power transfer operations should proceed (e.g., to transfer power to charge the battery of the receiving device) and the user of system 8 can be notified accordingly.

To inform a user about battery charging status, system 8 may provide the user with suitable output (e.g., visual output, haptic output, audio output, etc.). In the illustrative configuration of FIG. 1, system 8 includes two batteries (battery 26A and battery 26B). When a user plugs connector 30 into device 10A or device 10B (or when a device that is connected to connector 30 is removably attached to another device), DC power from converter 32 may be supplied to the device into which connector 30 is plugged and wireless power can be conveyed from the device into which connector 30 is plugged to the other device, provided that the ballast load wireless power transfer test is successful. The user of system 8 may therefore be interested to know: 1) whether the device into which connector 30 is plugged is charging its battery (or it about to charge its battery) and 2) whether the other device is receiving wireless power satisfactorily and therefore charging its battery (or is about to charge its battery).

Figure 2:
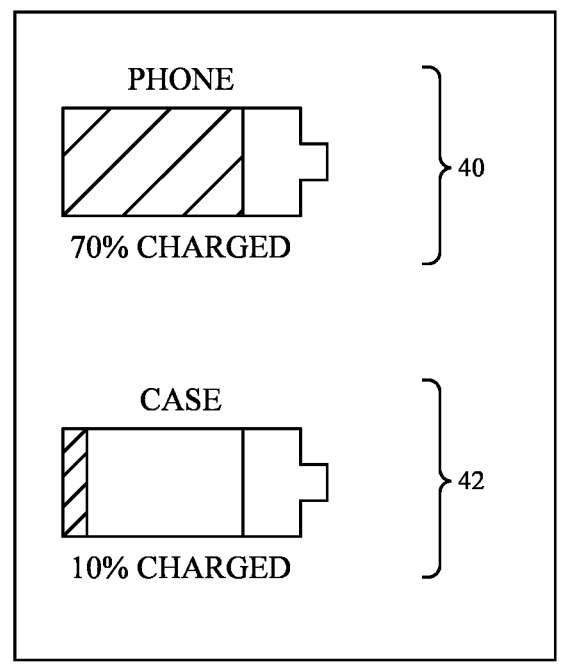
FIG. 2 is a diagram of an illustrative display screen with battery charge status information in accordance with an embodiment.

In an illustrative configuration, the charging status for each battery can be presented to the user rapidly (e.g., even before charging operations are fully ramped up). As an example, the user may be provided with a visual alert of the type shown in FIG. 2. The alert, which may sometimes be referred to as a chime, may include audio and/or visual output presented on device 10B (as an example). For example, a chime may involve presentation of an audible chime tone with a speaker in device 10B and a visual user interface affordance (e.g., battery charging icons or other visual alert displayed on a display in device 10B or other display). As shown in FIG. 2, which shows an illustrative display in device 10B, the visual user interface affordance may be a visual alert on the display that includes a battery charging status icon for the battery in device 10B (see, e.g., phone battery charge status indicator 40 for the phone battery) and a battery charging status icon for the battery in device 10A (see, e.g., battery case battery charge status indicator 42 for the case battery). The alert may include battery state-of-charge information (e.g., battery charge in %) and information (e.g., a green bar or other information, a battery-shaped image, etc.) indicating that charging is or will soon proceed normally. In the event that the ballast load wireless power test determines that coupling is not satisfactory, the alert may omit presentation of the case battery charge status indicator 42 on the display of device 10B, thereby indicating to the user that the battery case is misaligned. If desired, additional warnings may be presented to the user (e.g., text stating "case is misaligned, please reattach" may be displayed).

By performing the ballast load transmission test early (e.g., before commencing normal wireless power transmissions between devices), it can be determined early whether wireless power will be able to be transferred satisfactorily. This allows the alert to be presented to the user even before waiting for normal operations to commence (which may take 1-10 seconds, as an example, particularly in situations in which wireless power for battery charging is ramped up slowly to avoid risk of battery damage). The ability to rapidly present a chime to the user or to rapidly forgo presenting a chime to the user (e.g., within a predetermined time period such as a time period of 1 second, less than 1 second, less than 0.5 seconds, or less than 0.2 seconds, as examples), allows the user to be quickly informed that charging operations are proceeding normally (e.g., so that the user is comfortable walking away from system 8 while leaving devices 10A and 10B unattended until charging is complete) or are not proceeding normally (e.g., so that the user can realign the case to the phone before walking away).

Figure 3:
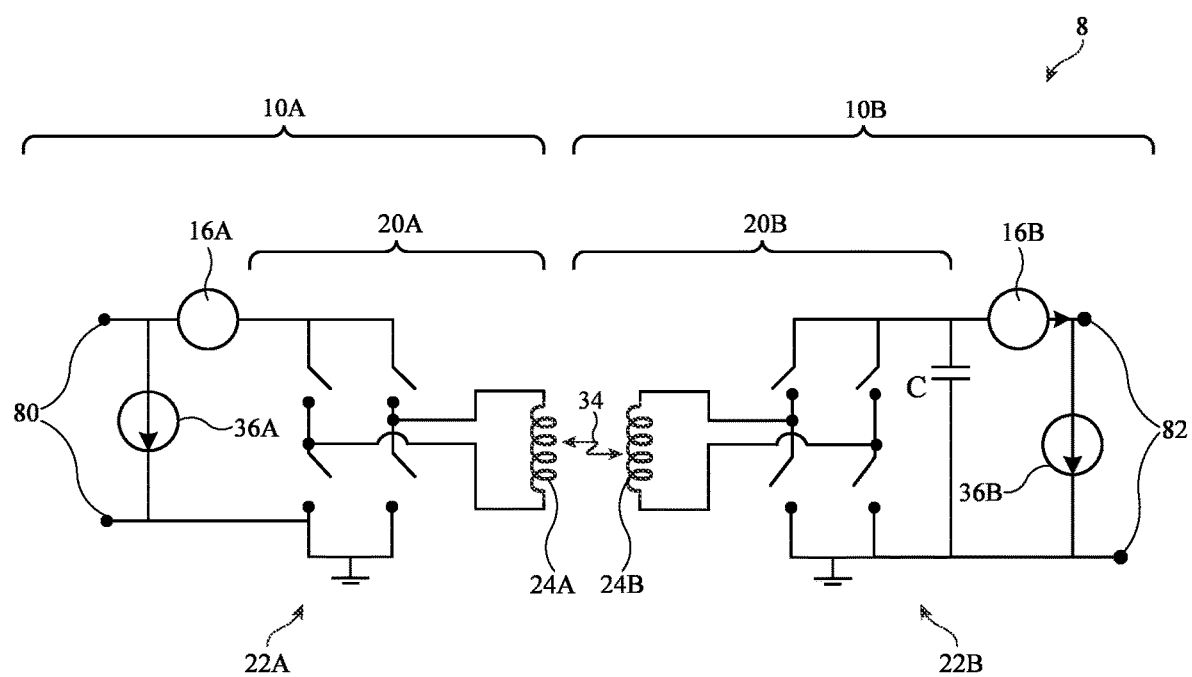
FIG. 3 is a diagram of illustrative wireless power system circuitry in accordance with an embodiment.

Wireless charging in system 8 may be unidirectional or bidirectional. Illustrative circuitry for supporting wireless power transfer from device 10A to device 10B and, in the opposite direction, from device 10B to device 10A is shown in FIG. 3. As shown in FIG. 3, device 10A may have wireless power circuitry 20A and device 10B may have wireless power circuitry 20B. Circuitry 20A may have inverter/rectifier circuitry 22A that can be operated as an inverter to transmit wireless power signals 34 to device 10B or as a rectifier to rectify wireless power signals 34 received from device 10B. When circuitry 20A is operated as a rectifier, the rectifier output voltage Vrect appears across terminals 80. Circuitry 20B may similarly have inverter/rectifier circuitry 22B that can be operated as an inverter to transmit wireless power signals 34 to device 10A or as a rectifier to rectify wireless power signals 34 received from device 10A. When circuitry 20B is operated as a rectifier, rectifier output voltage Vrect appears across terminals 82. Measurement circuitry in system 8 (e.g., measurement circuitry 16A and/or 16B) can be used to measure rectifier output voltages, rectifier currents (e.g., rectifier current levels flowing through ballast loads), inverter voltages, and/or inverter currents, and can be used to make other measurements.

Devices 10A and 10B may have ballast loads coupled between the rectifier output terminals of each respective device (e.g., one or more transistors configured to form ballast load current sources such as ballast loads 36A and 36B) controlled by the control circuitry of each device. When a device begins to receive wireless power, the ballast load can be used to temporarily dissipate the power before displays and other input-output devices, power management circuits, batteries, and/or other load circuitry is prepared to absorb the received power. For example, the ballast load can be used to dissipate received power during ballast load wireless power tests performed to determine whether there is satisfactory coupling between the coils of devices 10A and 10B.

Figure 4:
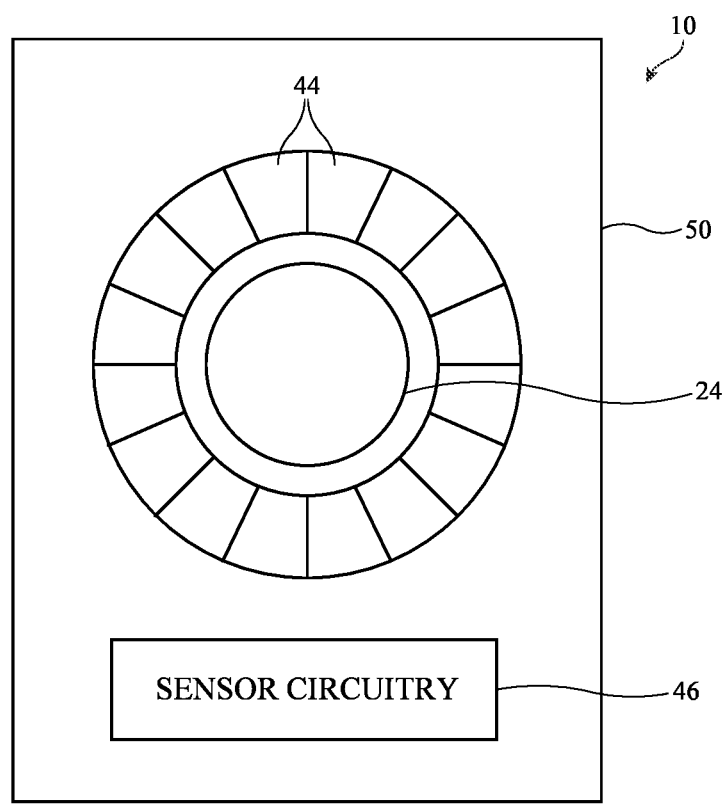
FIG. 4 is a view of an illustrative device showing how magnets may be used to align a wireless power coil with a corresponding wireless power coil in a mating device in accordance with an embodiment.

To help align coils 24A and 24B when device 10A is attached to device 10B, devices 10A and 10B may be provided with mating magnets. An illustrative magnet layout that may be used for device 10A and 10B is shown in FIG. 4. As shown in FIG. 4, device 10 (e.g., device 10A or 10B) may have a housing such as housing 50 in which a coil 24 (e.g., coil 24A or 24B) is mounted surrounded by magnets 44 (e.g., magnets with poles configured to mate with corresponding magnet poles in a removably attached device). Any suitable magnet pattern may be used to help align devices in system 8 to each other when attached.

Sensor circuitry 46 (e.g., one or more sensors in input-output devices 18A of device 10A and/or one or more sensors in input-output devices 18B of device 10B) such as a compass or other magnetic sensor, a near-field communications (NFC) reader (sometimes referred to as a radio-frequency identification reader or RFID reader) configured to detect and read NFC tags (radio-frequency identification tags, sometimes referred to as RFID tags), a proximity detector (e.g., a capacitive proximity detector, an optical proximity detector, etc.), a switch, and/or other sensing circuitry may be provided to detect when another device has been removably attached. For example, sensing circuitry in a phone such as a magnetic sensor may detect when magnets from a battery case are present and may therefore sense the presence of the battery case and/or sensing circuitry in a battery case may detect when magnets from a phone are present and may therefore detect the presence of the phone. Magnetic device presence sensing may be supplemented using one or more optional detection techniques performed before, after, and/or during magnetic sensing (e.g., NFC tag reading, proximity sensor detecting, and/or other sensing techniques implemented by the sensing circuitry of device 10A and/or 10B). By detecting when devices 10A and 10B are coupled to each other, system 8 can determine when to initiate ballast load wireless power testing operations (e.g., to detect whether coils 24A and 24B are sufficiently well aligned to start normal battery charging).

Figure 5:
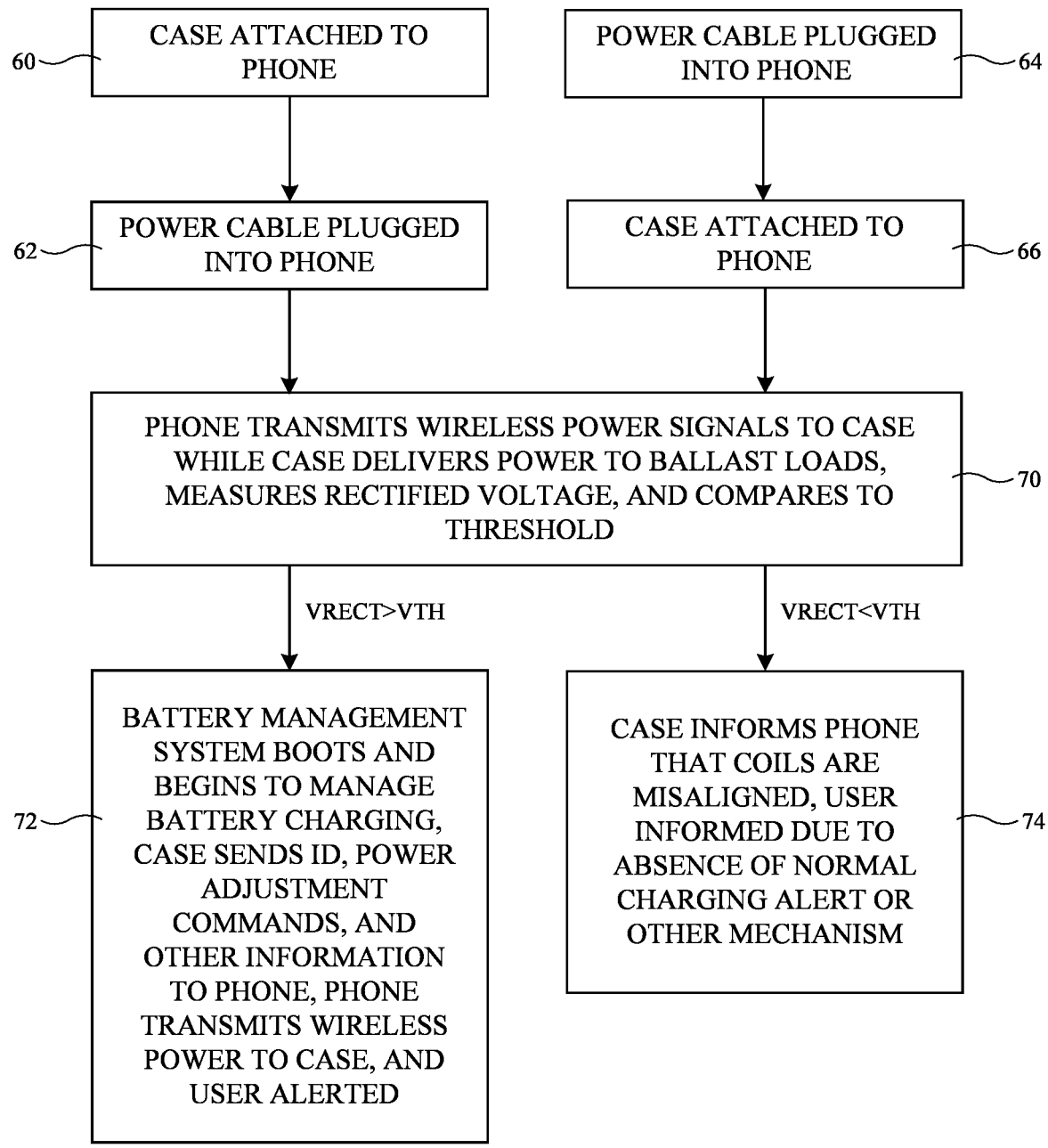
FIG. 5 is a flow chart of illustrative operations involved in operating a wireless power system in accordance with an embodiment.

FIG. 5 is a flow chart of illustrative operations involved in using system 8. In this illustrative example, device 10A is a removable battery case and device 10B is a portable electronic device such as a cellular telephone that is removably attached to the battery case. In general, devices 10A and 10B may be any suitable electronic devices with wireless power transfer capabilities.

In a first scenario, the case is attached to the phone (see, e.g., the operations of block 60) before connector 30 of converter 32 (and its associated cable of FIG. 1) is coupled to connector 28B of the phone (see, e.g., the operations of block 62). In a second operating scenario, connector 30 of converter 32 is coupled to connector 28B of the phone (see, e.g., the operations of block 64) before the case is attached to the phone (see, e.g., the operations of block 66).

In the first scenario, control circuitry 12B uses sensor circuitry 46 to detect the presence of the case during the operations of block 60 (e.g., by magnetically sensing magnets in the case, by using an RFID tag reader to read an RFID tag in the case, by using a proximity sensor to detect the presence of the case, by using any one of these techniques to initiate detection followed by another of these techniques to confirm detection, etc.). Circuitry 12B also detects when the power cable from converter 32 is plugged into the phone (e.g., by detecting the DC power that is being supplied by connector 30 at connector 28B during the operations of block 62). In the second scenario, control circuitry 12B detects when power is being supplied to the phone (e.g., by detecting DC power from converter 32 during the operations of block 64) and then uses sensor circuitry 46 to detect when the case has been attached to the phone (e.g., during the operations of block 66).

In response to detecting that the phone is coupled to AC-DC power converter 32 to receive DC power from converter 32 and that the case is attached to the phone, operations proceed to block 70. During the operations of block 70, control circuitry 12B in the phone uses circuitry 20B to begin to transmit ballast load test wireless power signals 34 to the case. During these test transmissions, the inverter (see, e.g., inverter/rectifier 22B) of the phone is powered with a known DC power supply voltage. The DC power supply voltage of the inverter may be the normal power supply voltage for the inverter (e.g., 15 V as an example) or may be a reduced power supply voltage (e.g., a reduced value of less than 15 V such as 13 V to help avoid potential over-voltages at the output of the rectifier in the case).

While using the inverter to drive coil 24B with a known inverter signal, the case in system 8 uses control circuitry 12A to direct the received power from circuitry 20A through the ballast load of the case (see, e.g., ballast load 36A of FIG. 3). In particular, control circuitry 12A may adjust ballast load 36A so that a predetermined amount of current (e.g., 100 mA) flows through load 36A as a test. If desired, measurement circuitry 16A may be used in measuring the current through load 36A. The predetermined amount of current may be a current level that is sufficiently high to ensure that the Vrect-versus-current behavior of the power receiving circuitry is linear and predictable, so that the normal power transfer efficiency of the case at normal (e.g., higher) power levels can be predicted satisfactorily from the results of the test. Control circuitry 12A uses measurement circuitry 16A (e.g., a voltage measurement circuit in circuitry 16A) to measure voltage Vrect at the output of the rectifier in the case while the predetermined ballast load current is flowing. The value of Vrect that is measured is then compared to a predetermined threshold voltage Vth.

If Vrect exceeds Vth, operations proceed to block 72. Because Vrect is greater than Vth, control circuitry 12A can conclude that the wireless power transfer efficiency of system 8 will be satisfactory for normal wireless charging. As a result, control circuitry 12A may use transceiver circuitry 14A to send one or more digital packets or other information to transceiver circuitry 14B of control circuitry 12B that informs control circuitry 12B that charging can proceed normally. In effect, this information serves as an instruction from the case to the phone that directs the phone to alert the user accordingly. For example, the user can be presented with a visual and/or audible alert of the type shown by indicator 42 of FIG. 2 indicating that case battery charging is proceeding normally (e.g., an audible chime tone and a visual user interface affordance such as a battery charging icon or other visual alert may be presented by system 8).

In response to being informed during the operations of block 72 that Vrect is greater than Vth or being otherwise informed that the wireless coupling efficiency between the phone and case is sufficient to allow normal charging to proceed, the alert for the user may be presented by the phone without waiting for system 8 to complete other system initialization operations. For example, the user may be alerted that case battery charging is commencing normally without waiting for system start-up operations to be completed (which might take, as an example 1-10 seconds to complete). As an example, it is not necessary for the battery management system in the case to boot up completely (e.g., to manage the charging of battery 26A with wireless power received from the phone), it is not necessary for the case to complete negotiations with the phone about appropriate wireless power transfer levels, it is not necessary for the case to transmit information such as a device identifier (case ID, etc.) to the phone, and it is not necessary for the case (e.g., the battery management system and/or other control circuitry in the case) to complete (or even to begin) transmitting power adjustment commands to the phone to control the amount of power transmitted from the phone to the case while slowly ramping up the battery charging rate of battery 26A (as may be desired when initiating battery charging for the case battery to help preserve the case battery).

If the case and phone are misaligned (e.g., because the case is not fully seated on the phone, etc.), coils 24A and 24B will not be aligned sufficiently to allow wireless power to be transferred with a desired efficiency level. In this situation, the value of Vrect that is measured at the output of the rectifier in inverter/rectifier circuitry 22A of the case will be less than VTH and operations will proceed to block 74. During the operations of block 74, the case sends one or more digital packets to the phone to inform the phone that the projected wireless power transfer efficiency level is lower than desired (e.g., Vrect is less than VTH) or may otherwise sends information to the phone that informs that phone that the case and phone are misaligned. If desired, the absence of a transmission from the case to the phone indicating that the wireless power transfer efficiency is satisfactory may serve to inform the phone that the case and phone are misaligned. For example, if the phone either receives a message from the case that indicates that wireless power transfer efficiency is too low or fails to receive a message from the case within a predetermined time period (e.g., 0.5 s or other suitable time period) indicating that the wireless power transfer efficiency level is satisfactory, the phone can alert the user accordingly.

In a first illustrative configuration, the phone may issue an audible or visual alert to the user (e.g., by presenting an alarm tone and/or a warning icon indicating that the phone and case are misaligned). In a second illustrative configuration, the phone may forgo the presentation of a normal charge status icon during the normal charging status icon presentation period. In this second illustrative configuration, for example, the phone may forgo presentation of battery case charging status indicator 42, but may continue to present phone charging status indicator 40. When the user observes that the expected battery case charging status icon is missing (e.g., when a battery charging status alert indicative or normal operations is not presented within an expected time period of 0.5 seconds or other suitable time period after the control circuitry of system 8 detects that the case and phone are attached and that converter 32 is connected to connector 28B), the user can conclude that the case and phone are not aligned properly and that normal wireless charging operations are not proceeding. Whether alerted though presentation of an audible chime, charging status icon, or other visual user interface affordance or through the absence of the presentation of such an alert within an expected time period, the user will be alerted by system 8 that the case and phone are not aligned and that corrective action should be taken (e.g., by reattaching the case to the phone so that coils 24A and 24B are aligned satisfactorily).

With the foregoing arrangement, the case and phone can determine that they are in proximity to each other with DC power being delivered by a cable to the phone. In response to a determination by the phone that the case is attached and that connector 30 is mated to connector 28B to deliver DC power from converter 32, the phone sends wireless test signals to the case by driving the inverter in the phone at a predetermined voltage level (e.g., the normal inverter voltage or a predetermined lower voltage). While these predetermined wireless signals (sometimes referred to as ballast load wireless power test signals) are being received at the case, the rectifier in the case rectifies these signals to produce Vrect while a predetermined amount of current is caused to flow through the ballast load. In response to determining in the case that Vrect is greater than Vth by measuring Vrect while allowing the predetermined amount of current to flow through the ballast load under known inverter drive conditions (e.g., a predetermined inverter voltage in the phone), the case sends a message to the phone that directs the phone to alert the user of the satisfactory charging condition. The phone then alerts the user by displaying case battery charging status icon 42 on the display of the phone or by otherwise informing the user that normal charging of the case battery is commencing. The system proceeds to initiate normal charging (e.g., the battery management system on the case boots up, the battery management system gathers battery information such as information on battery state-of-charge and, using a temperature sensor in the case, battery temperature information and other temperature sensor information that the cases uses to determine how to satisfactorily charge the battery, the case provides the phone with a case identifier that the phone may use in determining how to satisfactorily charge the case, the case sends power adjustment commands to the phone to control the amount of power transmitted from the phone wirelessly to the case, the case sends updated state-of-charge information to the phone indicating the state of charge of the case battery, the battery management system of the case begins charging the case battery with received wireless power, the battery charging rate is slowly ramped up to its maximum rate, etc.). From the initiation of charging to establishment of normal charging at a desired battery charge rate may take 1-10 seconds (e.g., due to the slow ramp up of the battery charge rate, the time taken to boot the battery management system and/or other control circuitry in the case, the time taken to gather sensor measurements such as battery temperature measurements, etc.).

While wireless power is being transferred to the case to charge the case battery, the phone battery can be charged using DC power provided over the cable from converter 32 to connector 28B. System 8 may use any suitable allocation scheme in determining how much power to use to charge the phone and case batteries (e.g., all power can initially be allocated to phone battery charging, power can be split evenly or unevenly between the case and phone batteries, power can be used primarily or exclusively to charge the case battery and not the phone battery, etc.). In determining how to allocate power, system 8 (e.g., the phone and/or case) can use information on battery state-of-charge values for the case and/or phone batteries, available power for battery charging (e.g., power available in surplus of other circuit loads), and/or other factors.

To indicate to the user that the phone battery is being charged, the phone can present a charge status icon such as charge status icon 40 of FIG. 2. Icons 40 and 42 or other alerts for the user may be presented simultaneously or at different times.

Although sometimes described herein in the context of a phone transmitting power wirelessly to a battery case, in general, any suitable first electronic device may transmit power wirelessly to any suitable second device in system 8. The first and/or second devices may include wireless charging mats, wireless charging pucks, cellular telephones, tablet computers, battery cases, laptop computers, desktop computers, keyboards and other accessories, wristwatches, earbuds, and/or other electronic equipment.

The foregoing is merely illustrative and various modifications can be made to the described embodiments. The foregoing embodiments may be implemented individually or in any combination.

What is claimed is:

1. A removable battery case configured to attach to a cellular telephone, comprising:
wireless power receiving circuitry configure to receive wireless power signals from the cellular telephone using a wireless power coil, wherein the wireless power receiving circuitry has a rectifier that produces a rectifier output voltage using power wirelessly received using the wireless power coil;
a battery;
a ballast load;
measurement circuitry configured to measure the rectifier output voltage;
control circuitry configured to:
cause current from the rectifier to flow through the ballast load;
measure the rectifier output voltage with the measurement circuitry while the current from the rectifier is flowing through the ballast load; and
charge the battery using current from the rectifier.

2. The removable battery case of claim 1 wherein the control circuitry is further configured to compare the measured rectifier output voltage to a threshold voltage.

3. The removable battery case of claim 2 wherein the control circuitry is further configured to inform the cellular telephone whether the measured rectifier output voltage is above the threshold voltage.

4. The removable battery case of claim 2 wherein the control circuitry is further configured to wirelessly inform the cellular telephone whether the measured rectifier output voltage is above the threshold voltage.

5. The removable battery case of claim 2 wherein the control circuitry is further configured to use the wireless power coil to transmit information wirelessly to the cellular telephone that informs the cellular telephone whether the measured rectifier output voltage is above the threshold.

6. The removable battery case of claim 5 wherein the control circuitry is configured to charge the battery after the wireless power coil has been used to transmit the information wirelessly to the cellular telephone.

7. The removable battery case of claim 1 wherein the rectifier has first and second terminals and wherein the ballast load comprises an adjustable current source connected between the first and second terminals.

8. The removable battery case of claim 1 wherein the control circuitry is configured to transmit power wirelessly to the cellular telephone using the wireless power coil and power from the battery.

9. A cellular telephone configured to receive a removable battery case, comprising:
a cellular telephone connector configured to receive a mating connector of an alternating-current-to-direct-current power converter supplying direct-current power;
a coil;
inverter circuitry configured to supply alternating-current signals to the coil to wirelessly transmit test signals to the removable battery case;
control circuitry configured to use to coil to wirelessly receive information from the removable battery case indicating whether an output voltage from a rectifier in the removable battery case exceeds a predetermined threshold voltage during transmission of the test signals; and
an input-output device configured to present an alert in response to receipt of information from the removable battery case indicating that the output voltage from the rectifier exceeded the predetermined threshold voltage.

10. The cellular telephone of claim 9 wherein the input-output device comprises a display and wherein the display is configured to display a case battery charging status icon in response to receipt of the information.

11. The cellular telephone of claim 10 wherein the removable battery case has a ballast load through which current flows from the rectifier during transmission of the test signals and wherein the cellular telephone comprises a speaker configured to present an audible output in response to receipt of the information.

12. The cellular telephone of claim 11 further comprising a cellular telephone battery, wherein the display is configured to present a visible charging status alert indicating a charging status for the cellular telephone battery.

13. The cellular telephone of claim 9 further comprising:
a housing; and
magnets in the housing that are configured to mate with corresponding magnets in the removable battery case.

14. The cellular telephone of claim 13 further comprising a magnetic sensor configured to sense attachment of the removable battery case to the housing.

15. The cellular telephone of claim 14 wherein the inverter is configured to supply the alternating-current signals to the coil at least partly in response to sensing attachment of the removable battery case to the housing using the magnetic sensor.

16. A non-transitory computer-readable storage medium storing one or more computer-executable instructions configured to be executed by one or more processors of a first electronic device that, when executed, cause the first electronic device to provide wireless power charging operations to a second electronic device, the computer-executable instructions comprising instructions for:
determining when the second electronic device is attached to the first electronic device;
determining when direct-current power is being provided to the first electronic device from an alternating-current-to-direct-current power converter;
in response to determining that the second electronic device is attached to the first electronic device and that the direct-current power is being provided, using wireless power circuitry in the first electronic device that includes an inverter and a coil to transmit wireless signals to the second electronic device; and
in response to wirelessly receiving information from the second electronic device indicating that more than a threshold amount of rectified voltage was produced at an output of a rectifier in the second electronic device while current flowed from the output of the rectifier through a ballast load in the second electronic device, causing the first electronic device to present an alert indicating that the wireless power transmission operations are commencing to charge a battery in the second electronic device.

17. The non-transitory computer-readable storage medium of claim 16, wherein the computer-executable instructions further comprise instructions for:

in response to receiving the information from the second electronic device, transmitting wireless power to the second electronic device that charges the battery in the second electronic device.

18. The non-transitory computer-readable storage medium of claim 17, wherein the first electronic device comprises a display, wherein the second electronic device comprises a removable battery case, and wherein the alert comprises a battery case battery charging status icon displayed on the display.

19. The non-transitory computer-readable storage medium of claim 18, wherein the first electronic device comprises a cellular telephone and wherein the computer-executable instructions further comprise instructions for displaying a cellular telephone battery charging status icon on the display.

20. The non-transitory computer-readable storage medium of claim 16 wherein the first electronic device comprises a magnetic sensor and wherein the computer-executable instructions for determining when the second electronic device is attached to the first electronic device comprise computer-executable instructions for using the magnetic sensor in sensing when the second electronic device is attached to the first electronic device.

21. The non-transitory computer-readable storage medium of claim 17 wherein the first electronic device comprises a display and a speaker and wherein the computer-executable instructions further comprise instructions for:
- using the display and speaker to present a first alert indicating that charging of the battery in the second electronic device is being commenced; and
- using the display and speaker to present a second alert indicating that the direct-current power is charging a battery in the first electronic device.

* * * * *

UNITED STATES PATENT AND TRADEMARK OFFICE
CERTIFICATE OF CORRECTION

PATENT NO. : 12,113,373 B2
APPLICATION NO. : 17/506285
DATED : October 8, 2024
INVENTOR(S) : Arash Mehrabi and Dmitry Berdnikov Page 1 of 1

It is certified that error appears in the above-identified patent and that said Letters Patent is hereby corrected as shown below:

In the Claims

Column 13, Line 10, "configure" should read -- configured --

Column 13, Line 65, "to use to coil" should read -- to use the coil --

Signed and Sealed this
Seventeenth Day of December, 2024

Derrick Brent
*Acting Director of the United States Patent and Trademark Office*